United States Patent
Carlson

[11] Patent Number: 6,014,912
[45] Date of Patent: Jan. 18, 2000

[54] FLYWHEEL ARRANGEMENT WITH AN ADDED MASS

[75] Inventor: Cora Carlson, Dittelbrunn, Germany

[73] Assignee: Mannesmann Sachs AG, Schweinfurt, Germany

[21] Appl. No.: 09/039,834

[22] Filed: Mar. 16, 1998

[30] Foreign Application Priority Data

Mar. 15, 1997 [DE] Germany ............................ 197 10 918

[51] Int. Cl.[7] .................................................. F16F 15/30
[52] U.S. Cl. ........................................... 74/574; 192/70.17
[58] Field of Search .................. 74/574, 573 R; 192/70.17; 464/66, 68

[56] References Cited

U.S. PATENT DOCUMENTS

| | | | |
|---|---|---|---|
| 4,887,485 | 12/1989 | Kobayashi et al. | 74/574 |
| 5,471,896 | 12/1995 | Schierling et al. | 74/574 |
| 5,476,166 | 12/1995 | Schierling et al. | 192/70.17 X |
| 5,597,059 | 1/1997 | Gebauer et al. | 192/70.17 X |

FOREIGN PATENT DOCUMENTS

| | | | |
|---|---|---|---|
| 2812268 | 10/1979 | Germany | 464/68 |
| 43 39 421 A1 | 6/1994 | Germany . | |
| 2 273 334 | 6/1994 | United Kingdom . | |
| 2 277 791 | 11/1994 | United Kingdom . | |

*Primary Examiner*—Mary Ann Battista
*Attorney, Agent, or Firm*—Cohen, Pontani, Lieberman & Pavane

[57] ABSTRACT

A flywheel arrangement with a drive-side transmission element and a driven-side transmission element which is rotatable relative to the drive-side transmission element includes at least one annular added mass fastened to at least one of the transmission elements. In order to produce the added mass, a blank formed from strip material is shaped in its longitudinal direction to form a ring, so that the corresponding ends of the blank are directed toward one another with a predetermined intermediate gap and are fixed in this position relative to one another by a retaining mechanism.

7 Claims, 4 Drawing Sheets

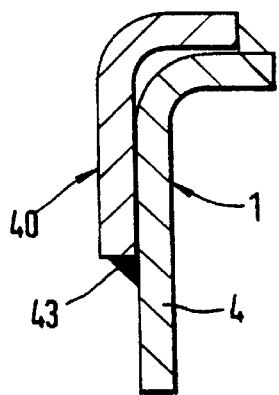
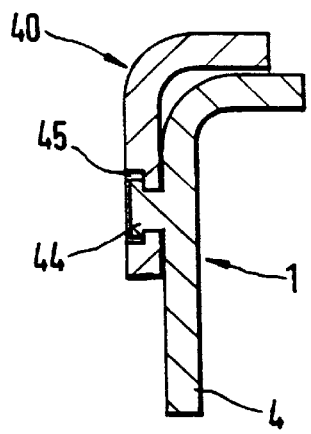
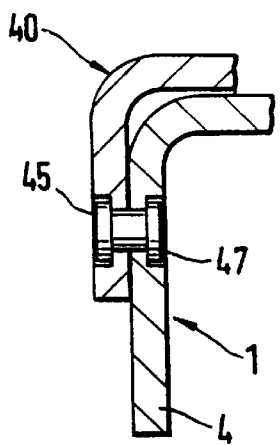
Fig. 2         Fig. 3         Fig. 4
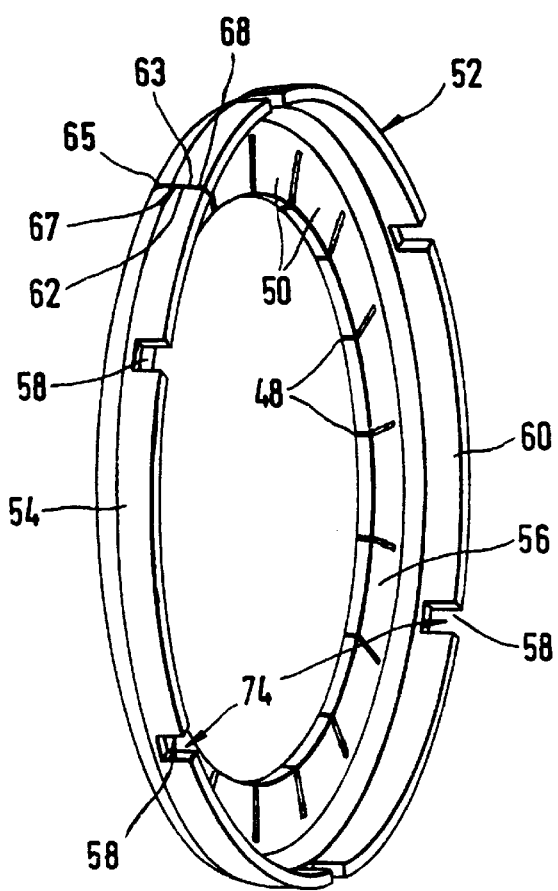
Fig. 5

FLYWHEEL ARRANGEMENT WITH AN ADDED MASS

BACKGROUND OF THE INVENTION

1. Field of the Invention

The invention is directed to a flywheel arrangement with a drive-side transmission element and a driven-side transmission element with an added mass fastened to at least one of the transmission elements.

2. Description of the Related Art

German reference DE 43 39 421 A1 discloses a flywheel arrangement with a transmission element on the drive side in the form of a first flywheel and a transmission element on the driven side in the form of a second flywheel, wherein the second flywheel is rotatable relative to the first flywheel. An annular added mass is fastened to one of the flywheels, namely the flywheel on the drive side. This added mass is provided, according to FIG. 1, at the side facing the crankshaft. On the other hand, according to FIG. 7, an annular added mass having an angular cross section is fastened to the transmission side of the flywheel on the drive side. Accordingly, the location at which such added masses can be arranged can be freely selected.

While the above German reference shows the advantages of an added mass of this kind, the manufacturing effort is considerable, especially when this added mass has an angular cross section as shown in FIG. 7. Such annular added masses are often produced from solid material by chip-removing or cutting machining. The material cost and production cost are accordingly very high. If this problem is avoided by producing the added mass in multiple parts, a precise alignment of these parts relative to one another is problematic because unwanted imbalances are easily introduced in the flywheel arrangement.

SUMMARY OF THE INVENTION

The object of the invention is to develop an added mass in a flywheel arrangement that is produced at the lowest possible expense in materials and costs.

This object is met by forming the added mass from a blank made of a strip material that is shaped in its longitudinal direction to form a ring so that the longitudinal ends of the blank are directed toward one another with a predetermined intermediate gap and are fixed in this position by a retaining means. Through the use of a blank produced from strip material, the blank can be dimensioned with respect to length such that when it is shaped to form a ring, it retains the exact diameter required by the added mass. It is recommended that work processes to be carried out on this blank are performed before the blank is shaped into a ring, since these work processes can be carried out on a flat structural component part substantially more simply and more economically than with a multi-dimensional structural component part. For example, open locations in the form of cut out portions, notches or recesses can be produced by a punching process, wherein supplementary functions can be performed through these open locations in the subsequent flywheel. It is conceivable, for example, to provide cut out portions that are suitable for inserting tools such as a wrench to access corresponding fasteners. Further, notches or recesses may be used as signaling means during the rotation of the flywheel arrangement, and accordingly of the added mass, wherein the signals are used for controlling the motor by acting as ignition marks.

As soon as these open locations are formed in the blank, the blank can be worked into the shape of a ring. Different methods are possible for maintaining this ring shape. For example, a rim that is usually provided at the flywheel arrangements in the form of a gear ring or toothed rim can be pushed over an axial area of the ring acting as added mass. In this configuration, the rim acts as retaining means for the ring by holding the ring under radial pretensioning. Prior to placing the rim over the ring, the ring may be pretensioned such that the gap between the ends of the ring is closed. In this condition, the rim easily slips over the ring and the ring is released in the rim to hold the ring in the rim. The ring and rim may also be assembled by fixedly connecting the two ends of the ring by welding them together or simply by fixing them together temporarily until some other means can be used after the ring is mounted to prevent them from springing apart as was described above.

It is perfectly acceptable for the ends of the ring to extend within the area of an open location. This has the advantage that the resulting joint gap will not lead to erroneous signal detection, It will be appreciated that this shaping process is carried out in a relatively simple manner, provided that the blank in the form of a flat structural component part is shaped into a ring. However, it is more difficult to produce a ring with an angular cross section, although a solution for this is likewise provided for. For this purpose, interruptions are produced in a punching process, possibly in the same punching process in which the above-mentioned open locations are produced, wherein these interruptions extend from one side of the blank toward the opposite side, but only over part of the width of this blank, a tongue being formed therebetween in each case. It is clear that these tongues, in view of their small dimensions in the longitudinal direction of the blank, will offer relatively slight resistance to the shaping of the blank into a ring. This is still the case, moreover, when the tongues are subsequently bent relative to the rest of a ring formed in this way to produce the angular cross section. In this way, an added mass of the desired cross section is formed without the need for high tangential forces or the introduction of stresses in the material due to high shaping forces.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

The invention is explained more fully with reference to an embodiment example.

FIG. 2 shows an enlarged detail of the flywheel arrangement of FIG. 1 in the area where the added mass is fastened to the associated flywheel;

FIG. 3 shows another embodiment of a connection between the added mass and the flywheel with a pin formed integral with the flywheel for fastening the added mass;

FIG. 4 shows another embodiment of a connection between the added mass and the flywheel with the fastening of the added mass by riveting;

FIG. 5 is a perspective view showing the added mass according to the invention detached from its flywheel and with notches in its axial area;

DETAILED DESCRIPTION OF THE PRESENTLY PREFERRED EMBODIMENTS

Figure 1:
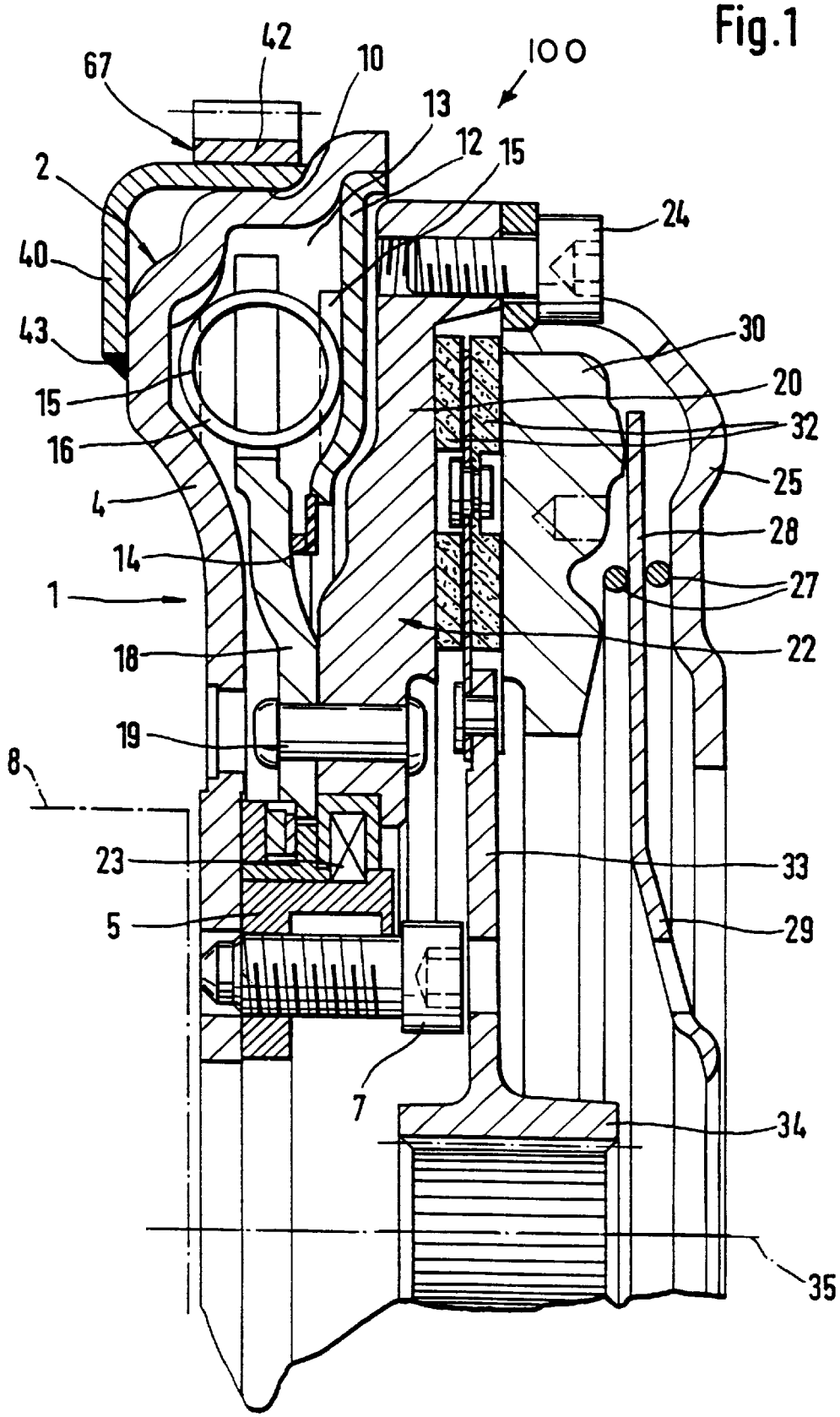
FIG. 1 shows a partial axial longitudinal section through a flywheel arrangement according to the invention with an added mass of angular cross section.

Referring initially to FIG. 1, a flywheel arrangement 100 includes a transmission element 1 on its drive side in the form of a flywheel 2. The flywheel 2 has a primary flange 4 which extends on the radial outer side of the flywheel 2. A radial inner end of flywheel 2 is connected with a hub 5 by fastening means 7 which further serve to connect the flywheel arrangement 100 to a crankshaft 8 (shown schematically in dash-dot lines) of a driving means, such as for example, an internal combustion engine (not shown).

The primary flange 4 comprises an axial portion 10 in its outer circumferential area. A cover plate 12 extends radially inward and is fastened to this axial portion 10. A grease chamber 13 which is filled at least partially with viscous medium is formed axially between the primary flange 4 and the cover plate 12. Elastic elements 16 of a torsional vibration damper are inserted within the grease chamber 3. These elastic elements 16 are controllable by control elements 15 that are provided on the sides of the grease chamber 3 at the primary flange 4 and at the cover plate 12. The elastic elements 16 are supported at a hub disk 18 which is connected by rivets 19 in the radial inner region with a flywheel 20 which acts as a transmission element 22 on the driven side of the flywheel arrangement 100. Flywheel 20 is rotatably supported by a bearing 23 on the hub 5 of the transmission element 1 on the drive side. Both transmission elements 1 and 22 are rotatable about a center axis 35 of the flywheel arrangement 100. A seal 14 for the grease chamber 13 seals an area between the above-mentioned hub disk 18 and the cover plate 12.

A clutch housing 25 of a friction clutch of conventional construction is held at the second flywheel 20 by fastening means 24. The clutch housing 25 holds a contact pressure spring 28 with retaining rings 27. The contact pressure spring 28 is acted upon during a clutch release (the clutch is constructed in a known manner and is therefore not shown) through spring tongues 29 which project radially inward. The radially outer region of the contact pressure spring 28 acts on a pressure plate 30. A clutch disk 33 with friction facing 32 is disposed at the second flywheel 20. Pressure plate 30 is supported by friction facings 32 of the clutch disk 33. The clutch disk 33 includes a clutch disk hub 34 in its radially inner region having a rotary connection with a gear shaft, not shown, by means of a conventional toothing.

The transmission element 1 on the drive side of the flywheel arrangement 100 includes, on the crankshaft side, an added mass 40 fastened to the primary flange 4 by means of a weld seam 43. The added mass 40 engages the axial portion 10 of the primary flange 4 and is enclosed by a toothed rim 42. The toothed rim 42 acts as retaining means 67 for the added mass 40 in a manner that will be described hereinafter. The added mass 40 is shown on the drive side in FIG. 1 only by way of example and can likewise be provided at the side which faces the second flywheel 20 as is shown, for example, in FIG. 7 of German Reference DE 43 39 421 A1.

The added mass 40 will be discussed more fully as follows: FIG. 2 once again shows, in an enlarged view, the added mass 40 fastened to the primary flange 4 of the drive-side transmission element 1 by weld seam 43. Referring now to FIG. 3, the connection is produced with a plurality of pins 44 formed at the crankshaft side of the primary flange 4 considered in the circumferential direction, wherein the pins 44 engage openings 45 in the added mass 40. The openings 45 are formed in such a way that they have a smaller diameter adjacent to the primary flange 4 compared with the crankshaft side. As soon as the added mass 40 is placed on the primary flange 4, a secure connection is achieved by compressing the pins 44 to form heads on the pins 44.

A similar connection is shown in FIG. 4, wherein the pins 44 shown in FIG. 3 are replaced by rivets 47. However, in view of the fact that the primary flange 4 adjoins the grease chamber 13, the solution according to FIG. 3 is preferred for the sake of better sealing, since in FIG. 3, the primary flange 4 is formed without interruptions or breaks on the grease chamber side.

Figure 6:
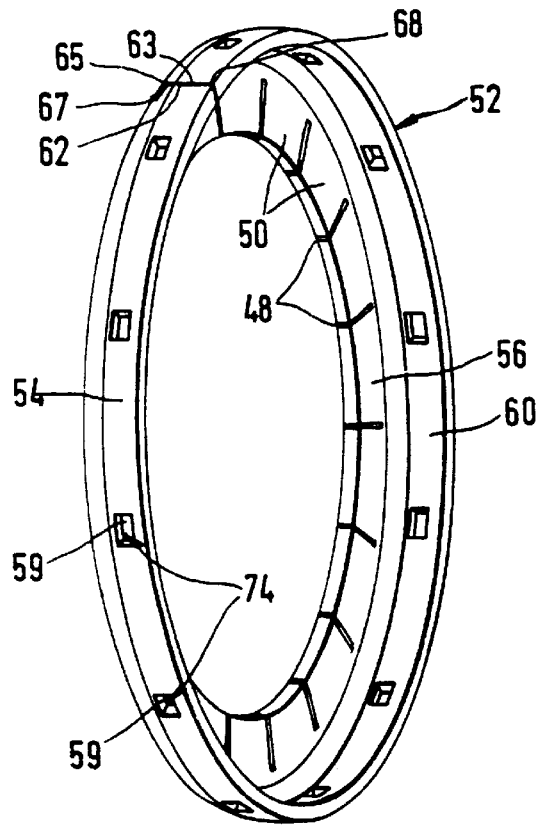
FIG. 6 is a perspective view showing another embodiment of the added mass with recesses in the axial area.
Figure 7:
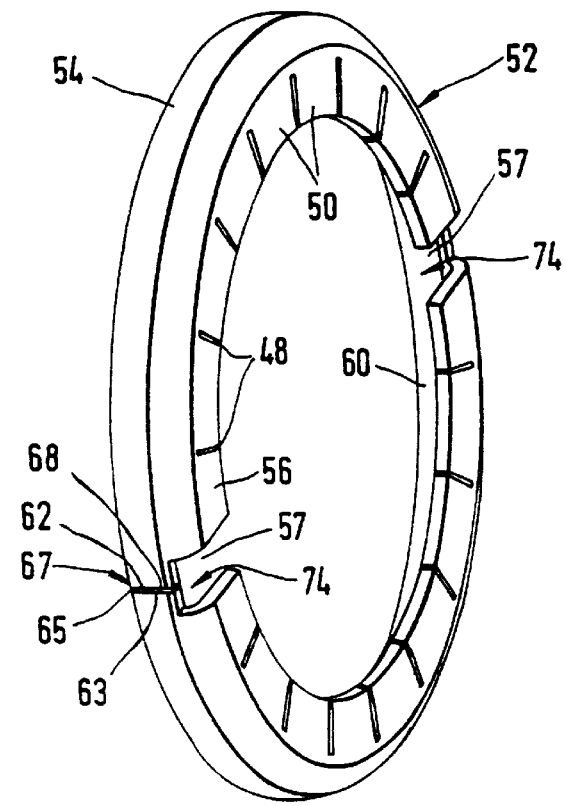
FIG. 7 is a perspective view showing another embodiment of the added mass with cut out portions in its radial area.

Referring now to FIGS. 5 to 7, the added mass 40 is constructed as a ring 52 with an angular cross section, wherein the ring 52 has an axial region 54 and a radial region 56. FIG. 5 shows notches 58 in the axial region 54 of the ring 52, while FIG. 6 shows recesses 59 in this axial region. The recesses 59 and the notches 58 thus form open locations 74 in the axial region 54 which can be used, for example, as signal transmitters in conjunction with a motor control. Such open locations 74 may be used, for example, as ignition markings. Additional open locations 74 are shown in FIG. 7, in which cut out portions 57 are shown in the radial region 56 of the ring 52. These cut out portions 57 may be required, for example, to allow the insertion of tools in the event that such access is necessary at the location in question for repairs or adjustments of the flywheel arrangement 100.

Figure 8:
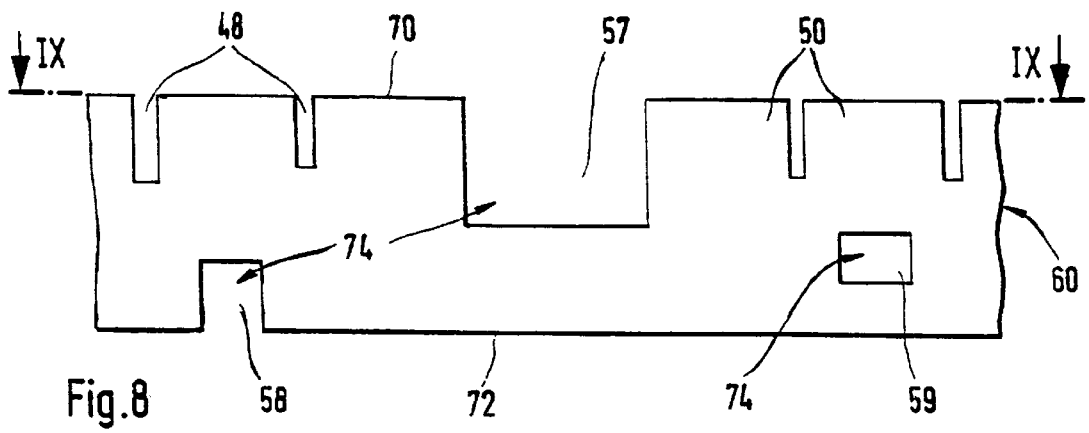
FIG. 8 is a top view showing a blank provided for the production of an added mass.
Figure 9:
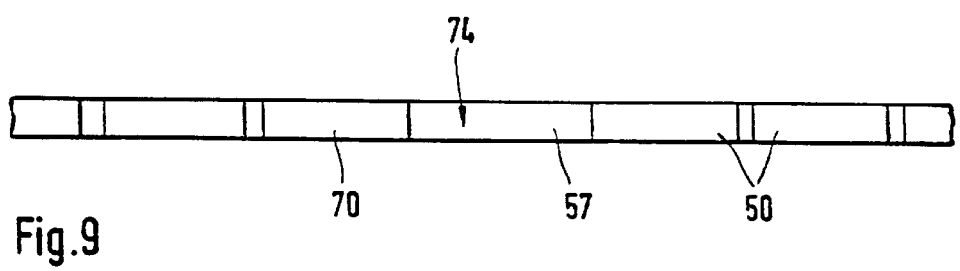
FIG. 9 is a view of a narrow side of the blank viewed from direction IX—IX in FIG. 8.

The present added mass 40 is produced in a particularly advantageous manner according to the invention. For this purpose, as can be seen particularly from FIGS. 8 and 9, a flat strip material is cut to a length that is selected such that when this strip material is worked into a circular shape, the resulting ring 52 has the required diameter for embracing the axial portion 10 of the primary flange 4. The shaping is preferably effected in this case by rolling.

With respect to the strip material which is cut to the correct size, a blank 60 is formed which can subsequently be provided with cut out portions 57, notches 58 and/or recesses 59, if needed, preferably by means of at least one punching process. Independent from the production of these open locations 74, interruptions 48 are provided proceeding from one side 70 of the blank 60 and extending toward the other side 72 of the blank 60, but are not continued all the way to the other side 72. As a result, tongues 50 are formed between every two interruptions 48.

The blank 60 formed in this way is subsequently shaped in the manner described above to form a ring 52, wherein this ring initially has only one axial region. The tongues 50 are then bent, wherein the bending region is preferably situated in the end region of the interruptions 48. Because of the small width by which the tongues 50 extend in the circumferential direction, this bending is accomplished, in contrast to a closed ring, with relatively little force and without substantial displacement of material, so that this area of the ring 52 remains virtually free of stresses.

There are different possible procedures for maintaining the annular shape of the ring 52 deformed in this way. In the solution shown in FIG. 1, the blank 60 is so dimensioned prior to working into the annular shape that a relatively large intermediate gap 65 (FIGS. 5 to 7) remains in the ring 52 between the two ends 62 and 63. The ring 52 is then pressed together until the intermediate gap 65 is eliminated and the two ends 62 and 63 therefore contact one another. Subsequently, a rim 42, for example, a toothed rim according to FIG. 1, is placed on the ring 52 that is pretensioned in this way. When the ring 52 is relaxed, the radial outer side of its axial region 54 contacts the inner circumference of the toothed rim 42 so that the toothed rim 42 acts as retaining means 67 for the ring 52. The toothed rim 42 is preferably dimensioned in such a way that the ring 52 is held under radial pretensioning. Of course, other methods are also conceivable, for example, that of shrinking on the toothed rim 42. In order to do without compression of the ring 52 for placing on the toothed rim 42, the two ends 62, 63 can also be temporarily held together by spot welds.

If a rim 42 is not used as retaining means 67, it is also conceivable to permanently connect the two ends 62, 63 by means of a weld seam 68. In this case, the weld seam 68 acts as retaining means 67.

Figure 10:
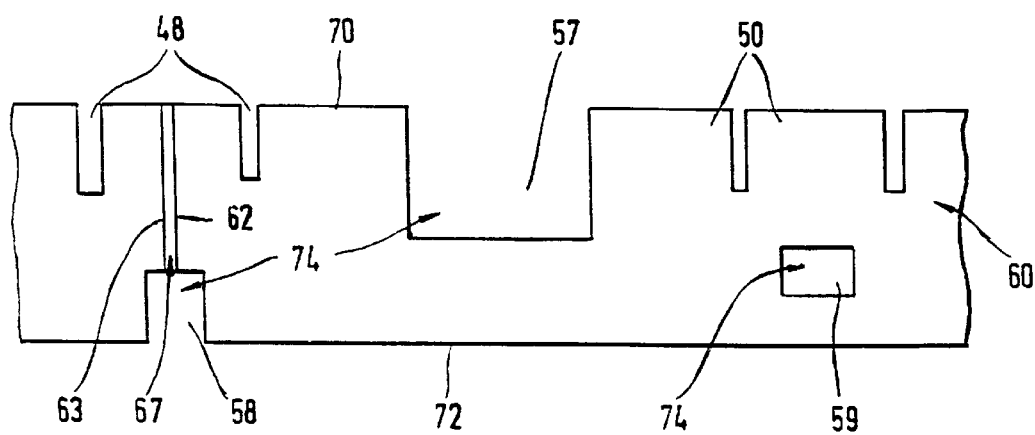
FIG. 10 is a top view showing another embodiment of a blank with a joint gap in a blank which is bent to form a ring

According to FIG. 10, the ends 62, 63 of the ring 52 are arranged in the region of die notch 58. This is advantageous for preventing erroneous signal detection. The ends 62, 63 could also extend within the area of another open location 74, for example, a cut out portion 57 or a recess 59.

The invention is not limited by the embodiments described above which are presented as examples only but can be modified in various ways within the scope of protection defined by the appended patent claims.

I claim:

1. A flywheel apparatus for a drivetrain of a motor vehicle, comprising:

a drive-side transmission element rotatably mountable on a rotating axis of the drivetrain;

a driven-side transmission element which is rotatable relative to the drive-side transmission element;

at least one annular added mass having an angular cross section around a majority of its circumference fastened to at least one of the drive-side transmission element and the driven-side transmission element, wherein said added mass comprises a blank produced from strip material having longitudinal ends and shaped in its longitudinal direction to form a ring so that the longitudinal ends of the blank are directed toward one another with a predetermined intermediate gap, the blank comprising interruptions at predetermined intervals in its longitudinal direction forming tongues between every two of the interruptions, at least part of a length of each of said tongues is subjected to a bending process relative to the remainder of the blank for producing said angular cross section; and retaining means for fixing the position of the ring.

2. The flywheel apparatus of claim 1, wherein said retaining means comprises a rim that is mounted over the blank that is shaped to form the ring and holds the ring under radial pretensioning.

3. The flywheel apparatus of claim 1, wherein said retaining means comprises a weld seam connecting the two ends of the blank such that they are engaged by the weld seam.

4. The flywheel apparatus of claim 1, wherein the interruptions in the blank are produced by punching.

5. The flywheel apparatus of claim 1, wherein said blank further comprises open locations for supplementary functions of the added mass.

6. The flywheel apparatus of claim 5, wherein one of said open locations is arranged in an area of said ring encompassing a portion of the longitudinal ends of the blank so that the longitudinal ends extend into the area of the one of the open locations.

7. The flywheel apparatus of claim 5, wherein said supplementary functions comprise one of providing ignition timing information and provide access for repairs or adjustments.

* * * * *